US012312979B1

(12) United States Patent
Sutterfield et al.

(10) Patent No.: US 12,312,979 B1
(45) Date of Patent: May 27, 2025

(54) RETAINER RINGS FOR VANE ASSEMBLIES USED IN GAS TURBINE ENGINES

(71) Applicant: Rolls-Royce North American Technologies, Inc., Indianapolis, IN (US)

(72) Inventors: David L. Sutterfield, Indianapolis, IN (US); Aric Acius, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 0 days.

(21) Appl. No.: 18/583,829

(22) Filed: Feb. 21, 2024

(51) Int. Cl.
*F01D 9/04* (2006.01)

(52) U.S. Cl.
CPC ............ *F01D 9/041* (2013.01); *F01D 9/042* (2013.01); *F05D 2230/60* (2013.01); *F05D 2240/12* (2013.01)

(58) Field of Classification Search
CPC ..... F01D 9/00; F01D 9/02; F01D 9/04; F01D 9/041; F01D 9/042; F05D 2230/60; F05D 2260/30; F04D 2240/10; F04D 2240/12
See application file for complete search history.

(56) References Cited

U.S. PATENT DOCUMENTS

| | | | | |
|---|---|---|---|---|
| 2,937,000 | A | 5/1960 | Ledwith | |
| 4,326,835 | A | 4/1982 | Wertz | |
| 5,536,145 | A | 7/1996 | Vandendriessche | |
| 5,797,725 | A | 8/1998 | Rhodes | |
| 6,517,313 | B2 | 2/2003 | Rogers | |
| 7,238,003 | B2 | 7/2007 | Synnott et al. | |
| 8,206,100 | B2 | 6/2012 | Schuler et al. | |
| 9,677,427 | B2 | 6/2017 | Synnott | |
| 10,975,706 | B2 | 4/2021 | Farrar et al. | |
| 11,002,147 | B2 | 5/2021 | Dyer | |
| 11,268,393 | B2 | 3/2022 | Liles et al. | |
| 2014/0147262 | A1* | 5/2014 | Grelin .................. | F01D 11/001 415/191 |

* cited by examiner

*Primary Examiner* — Elton K Wong
(74) *Attorney, Agent, or Firm* — Barnes & Thornburg

(57) ABSTRACT

A vane assembly includes an outer case, a plurality of vanes, and an inner body assembly. The outer case defines an outer boundary of a flow path of the vane assembly. The plurality of vanes extend radially inward from the outer case relative to a central axis. The inner body assembly is configured to secure the plurality of vanes radially relative to the central axis. The inner body assembly includes an inner case arranged circumferentially about the central axis, a band coupled with the inner case, and a retainer ring that extends into the band and into each of the plurality of vanes.

20 Claims, 15 Drawing Sheets

RETAINER RINGS FOR VANE ASSEMBLIES USED IN GAS TURBINE ENGINES

FIELD OF THE DISCLOSURE

The present disclosure relates generally to gas turbine engines, and more specifically to vane assemblies used in gas turbine engines.

BACKGROUND

Gas turbine engines are used to power aircraft, watercraft, power generators, and the like. Gas turbine engines typically include an engine core having a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Gas turbine engines also typically include a vane assembly. The vane assembly includes vanes that adjust a direction of airflow received from rotating blade assemblies within the gas turbine engine. Some vanes may be difficult to couple with other components within the vane assembly due to factors such as limited circumferential space between each of the vanes.

SUMMARY

The present disclosure may comprise one or more of the following features and combinations thereof.

A vane assembly adapted for use in a gas turbine engine may comprise an outer case, a plurality of vanes, and an inner body assembly. The outer case may be arranged around a central axis to define an outer boundary of a flow path of the vane assembly. The plurality of vanes may extend radially inward from the outer case to direct air through the flow path. The inner body assembly may be arranged around the central axis to define an inner boundary of the flow path of the vane assembly. The inner body assembly may be configured to secure the plurality of vanes radially relative to the central axis. The inner body assembly may include an inner body and a retainer ring.

In some embodiments, the inner body may include a band and an inner case arranged circumferentially about the central axis. The inner case may have an outer surface that provides the inner boundary of the flow path of the vane assembly and an inner surface opposite the outer surface. The band may be coupled with the inner surface of the inner case. The retainer ring may extend into the band of the inner body and into each of the plurality of vanes so that the band radially locates the retainer ring relative to the central axis and the retainer ring radially locates each of the plurality of vanes relative to the central axis.

In some embodiments, the band may be formed to include a slot that extends axially into the band. Each vane of the plurality of vanes may be formed to include a notch that extends axially into each vane. The slot formed in the band may extend circumferentially about the central axis. The slot formed in the band and the notch formed in each vane of the plurality of vanes may be radially aligned with one another and cooperate to form a continuous retainer ring receiver that extends entirely circumferentially about the central axis. The retainer ring may include a ringbody that extends circumferentially about the central axis and a flange that extends axially away from the ringbody and into the slot formed in the band and the notch formed in each vane of the plurality of vanes.

In some embodiments, the retainer ring may include a plurality of segments that cooperate to extend circumferentially about the central axis. The retainer ring may be an integral, single-piece that forms a full hoop. The flange of the retainer ring may extend entirely circumferentially about the central axis. The outer case may be formed to include a plurality of outer openings extending radially through the outer case. The plurality of outer openings may be spaced apart circumferentially from one another. The inner case may be formed to include a plurality of inner openings extending radially through the inner case. The plurality of inner openings may be spaced apart circumferentially from one another. Each vane of the plurality of vanes may extend through a corresponding one of the plurality of outer openings and through a corresponding one of the plurality of inner openings.

In some embodiments, the band may be formed to include a plurality of cutouts extending radially into the band. The plurality of cutouts may be spaced apart circumferentially from one another. Each vane of the plurality of vanes may be located within a corresponding one of the plurality of cutouts. Each cutout of the plurality of cutouts may be circumferentially aligned with a corresponding one of the plurality of inner openings so that each vane of the plurality of vanes extends through a corresponding one of the plurality of inner openings and into a corresponding one of the plurality of cutouts.

According to another aspect of the present disclosure, a vane assembly adapted for use in a gas turbine engine may comprise an outer case, a vane, and an inner body assembly. The outer case may be arranged around a central axis to define an outer boundary of a flow path of the vane assembly. The vane may extend radially inward from the outer case to direct air through the flow path. The inner body assembly may include an inner body and a retainer ring. The inner body may be arranged around the central axis to define an inner boundary of the flow path of the vane assembly. The retainer ring may be configured to fix the vane radially relative to the central axis. The inner body may have an inner case arranged to extend circumferentially about the central axis and a band arranged radially inward of the inner case. The retainer ring may be arranged radially inward of the inner case and may extend axially into the band of the inner body and the vane to secure the vane to the inner case and prevent radial outward movement of the vane relative to the central axis.

In some embodiments, the band of the inner body may be formed to include a slot that extends axially into the band and circumferentially about the central axis. The vane may be formed to include a notch that extends axially into the vane. The slot formed in the band and the notch formed in the vane may be radially aligned with one another.

In some embodiments, the retainer ring may include a ringbody that extends circumferentially about the central axis and a flange that extends axially away from the ringbody and into the slot formed in the band and the notch formed in the vane. The outer case may be formed to include an outer opening extending radially through the outer case. The inner case may be formed to include an inner opening extending radially through the inner case. The vane may extend through the outer opening and through the inner opening. The band may be formed to include a cutout extending radially into the band. The vane may be located within the cutout.

A method may comprise arranging an inner case that extends circumferentially around a central axis radially inward of an outer case that extends circumferentially around the central axis to define a flow path therebetween. The method may comprise coupling a band with the inner case to locate the band radially inward of the inner case. The method may comprise extending a vane radially between the outer case and the inner case. The method may comprise axially positioning a retainer ring radially inward of the inner case and axially adjacent the band. The method may comprise moving the retainer ring axially into engagement with each of the band and the vane so that a flange of the retainer ring extends axially into each of the band and the vane.

In some embodiments, the method may comprise inserting the vane radially through an outer opening extending radially through the outer case and an inner opening extending radially through the inner case. The method may comprise positioning a radially-inward end of the vane in a cutout extending radially into the band. The band may be a first band and the retainer ring may be a first retainer ring. The method may comprise coupling a second band with the inner case axially aft of the first band, axially positioning a second retainer ring radially inward of the inner case and axially adjacent the second band, and moving the second retainer ring axially into engagement with each of the second band and the vane so that a flange of the second retainer ring extends axially into each of the second band and the vane.

These and other features of the present disclosure will become more apparent from the following description of the illustrative embodiments.

DETAILED DESCRIPTION

Figure 1:
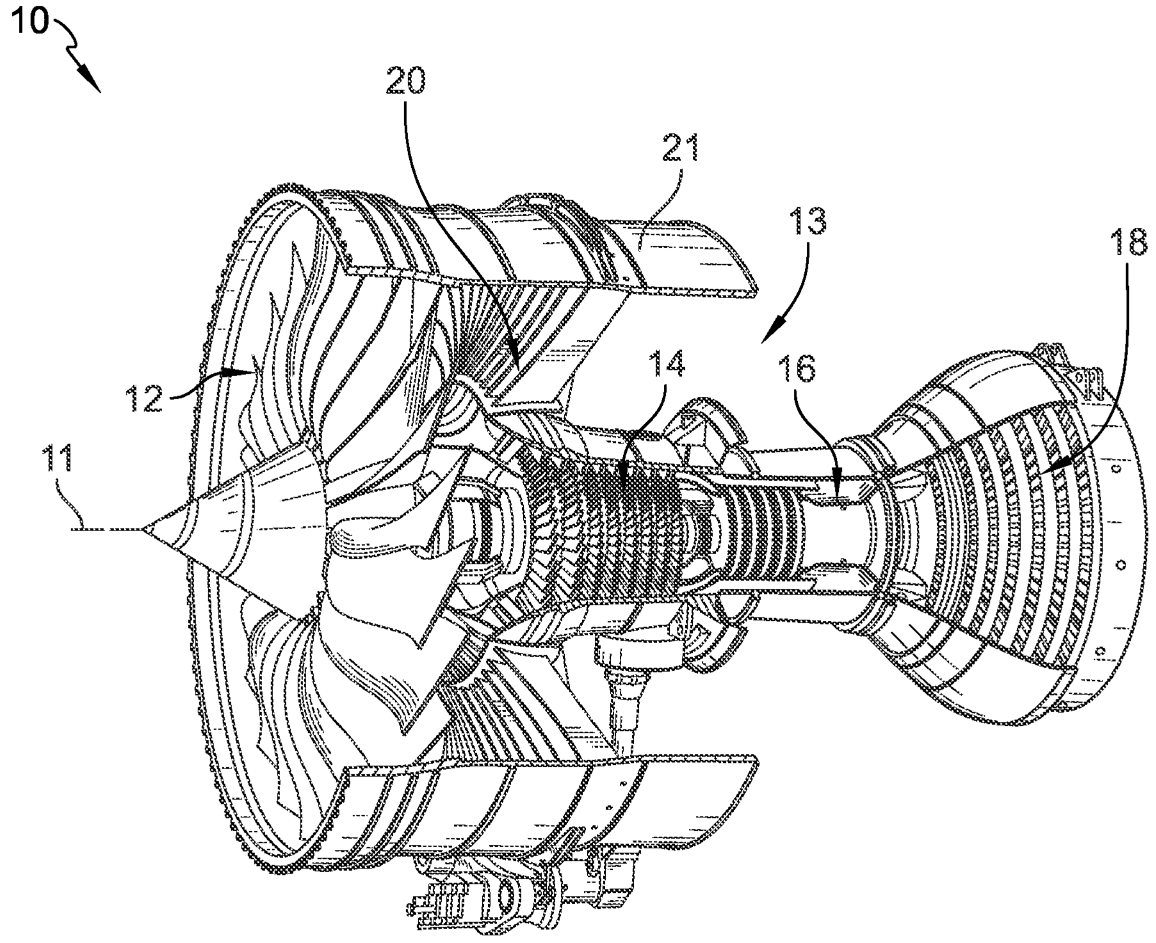
FIG. 1 is a cutaway view of a gas turbine engine that includes a fan that extends radially outward relative to a central axis, a vane assembly located downstream of the fan in a bypass duct of the engine, a compressor located downstream of the fan and radially inward of the vane assembly, a combustor located downstream of the compressor, and a turbine located downstream of the combustor.

For the purposes of promoting an understanding of the principles of the disclosure, reference will now be made to a number of illustrative embodiments illustrated in the drawings and specific language will be used to describe the same.

An illustrative gas turbine engine 10 includes a fan 12 and an engine core 13 having a compressor 14, a combustor 16 located downstream of the compressor 14, and a turbine 18 located downstream of the combustor 16 as shown in FIG. 1. The fan 12 is driven by the turbine 18 and provides thrust for propelling the gas turbine engine 10. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

Figure 2:
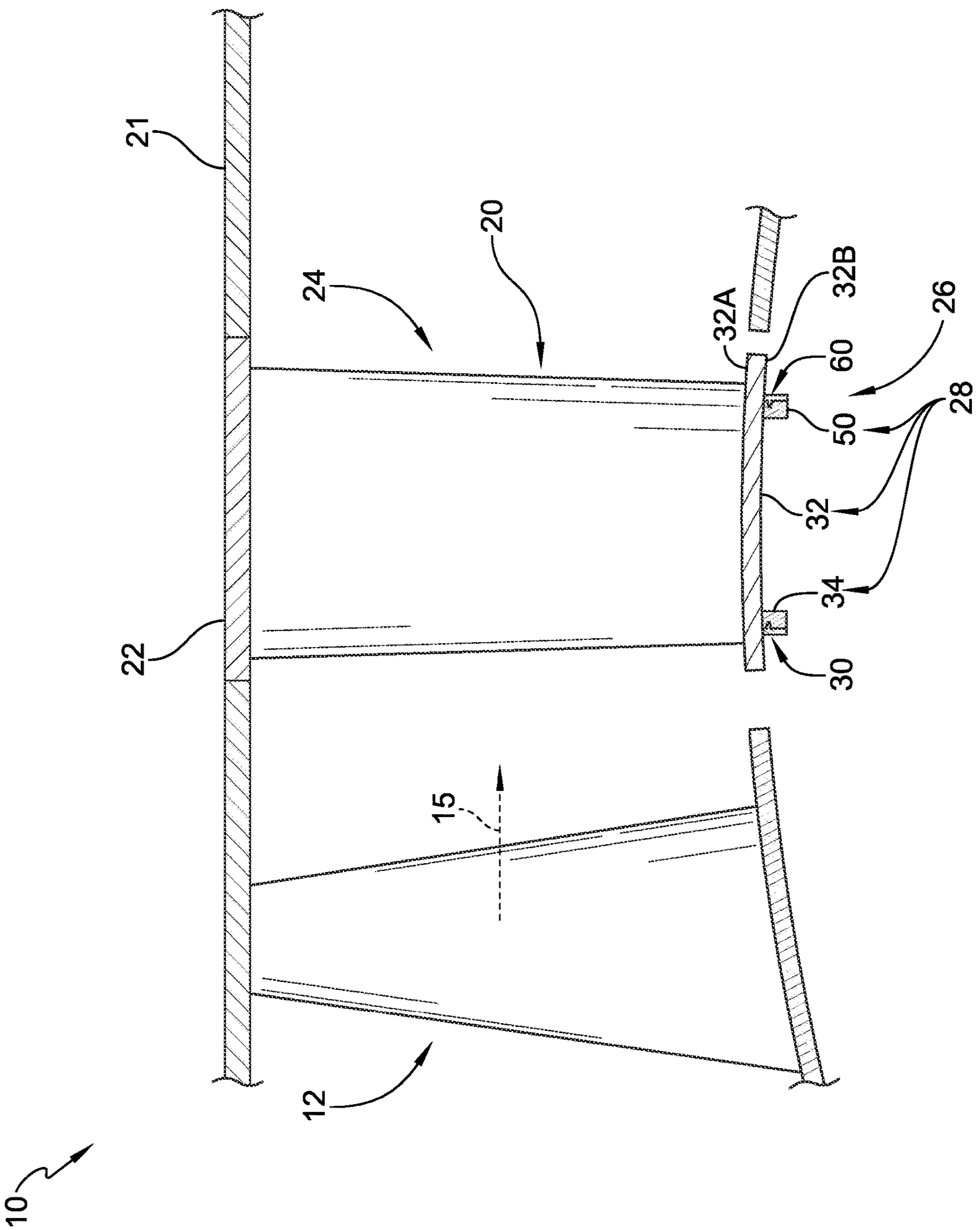
FIG. 2 is a diagrammatic sectional view of a portion of the gas turbine engine of FIG. 1 showing one of the fan blades of the fan and that the vane assembly includes an outer case arranged circumferentially about the central axis to define an outer boundary of a flow path of the vane assembly, a plurality of vanes extending radially inward from the outer case to direct air through the flow path, and an inner body assembly that defines an inner boundary of the flow path.

The gas turbine engine 10 further includes a vane assembly 20 located in a bypass duct 21 arranged around the engine core 13 as shown in FIGS. 1 and 2. In some embodiments, as shown in FIGS. 1 and 2, the vane assembly 20 is arranged downstream of the fan 12. However, the vane assembly 20 may be used in a variety of locations within the gas turbine engine 10, such as, but not limited to, the bypass duct 21, the compressor 14, the turbine 18, or downstream of the turbine 18.

Figure 3:
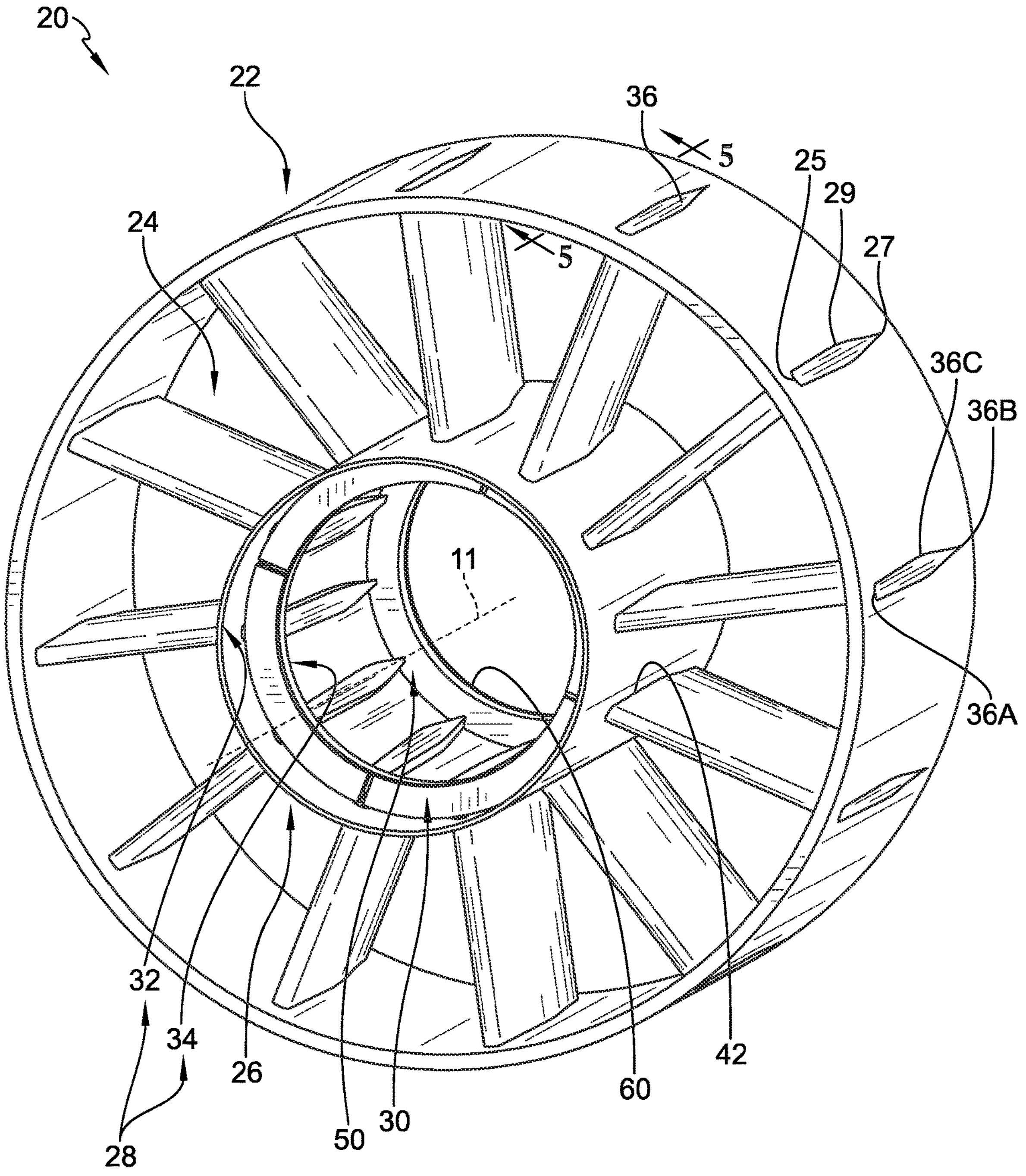
FIG. 3 is a perspective view of the vane assembly included in the gas turbine engine of FIG. 1 showing that the outer case of the vane assembly is formed to include a plurality of outer openings extending radially through the outer case and the inner case is formed to include a plurality of inner openings extending radially through the inner case, and further showing that each vane of the plurality of vanes extends through one of the plurality of outer openings and through one of the plurality of inner openings.

The vane assembly 20 includes an outer case 22, a plurality of vanes 24 spaced apart circumferentially around the central axis 11, and an inner body assembly 26 as shown in FIGS. 2 and 3. The outer case 22 is arranged around the central axis 11 to define an outer boundary of a flow path 15 of the vane assembly 20. The plurality of vanes 24 extend radially inward from the outer case 22 to direct air through the flow path 15. The inner body assembly 26 is arranged around the central axis 11 radially inward of the outer case 22 to define an inner boundary of the flow path 15. The inner body assembly 26 secures the plurality of vanes 24 thereto, as shown in FIG. 3, so that the plurality of vanes 24 are fixed in place radially relative to the central axis 11.

The inner body assembly 26 includes an inner body 28 and a first retainer ring 30 as shown in FIGS. 2 and 3. The inner body 28 is arranged radially inward of the outer case 22 and includes an inner case 32 and a first band 34 coupled to the inner case 32 that each receive the plurality of vanes 24 therein. The first retainer ring 30 is positioned radially inward of the inner case 32 and axially adjacent the first band 34. In the illustrative embodiment, the inner body assembly 26 includes a first retainer ring 30 and a second retainer ring 60 as described further below. In other embodiments, one of the retainer rings 30, 60 may be omitted.

In some conventional gas turbine engines, vanes are secured to an inner case via bolting, brazing, welding, gluing, or other similar methods. However, in some instances, the circumferential space between each vane may be limited. Because of the limited circumferential space between each vane, traditional methods for securing the vanes to the inner case may be difficult to implement.

The present disclosure allows for the vanes 24 to be secured with minimal circumferential space between each vane 24. To secure the plurality of vanes 24 to the inner case 32, the first retainer ring 30 extends axially into the first band 34 of the inner body 28 and into each of the plurality of vanes 24 to radially locate each of the plurality of vanes 24 relative to the central axis 11. The first retainer ring 30 radially locates each of the plurality of vanes 24 with minimal intrusion to the plurality of vanes 24 such that limited circumferential space between each of the plurality of vanes 24 is not problematic.

Figure 4:
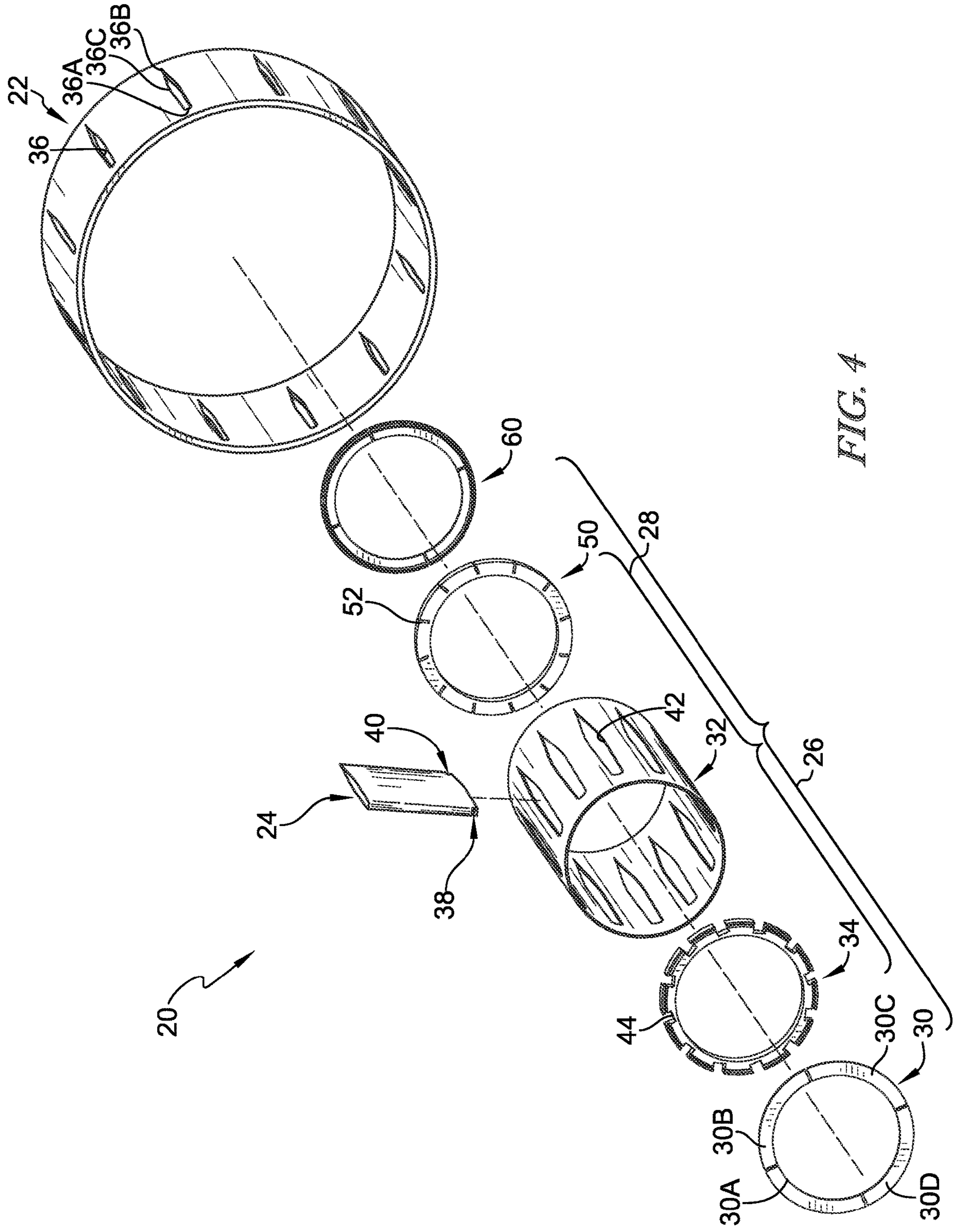
FIG. 4 is an exploded assembly view of the vane assembly of FIG. 3 showing that the vane assembly includes, from left to right, a first retainer ring, a first band, the inner case (and one illustrative vane), a second band, a second retainer ring, and the outer case, and further suggesting that the first retainer ring is located axially forward of the first band and the second retainer ring is located axially aft of the second band.

The plurality of vanes 24 extend radially between the outer case 22 and the inner case 32 as shown in FIG. 3. The outer case 22 is formed to include a plurality of outer openings 36 to receive the plurality of vanes 24 therein as shown in FIGS. 3 and 4. The plurality of outer openings 36 extend radially through the outer case 22 and are spaced apart circumferentially from one another around the outer case 22. Each of the plurality of outer openings 36 includes a forward end 36A, an aft end 36B axially aft of the forward end 36A, and a mid-portion 36C axially between the forward end 36A and the aft end 36B.

As shown in FIG. 3, the plurality of vanes 24 are spaced apart from one another about the central axis 11. Each of the plurality of vanes 24 extends through a corresponding one of the plurality of outer openings 36 of the outer case 22. To match an outer shape of the plurality of vanes 24, the plurality of outer openings 36 widen as the plurality of outer openings 36 extend from the forward end 36A to the mid-portion 36C, and the plurality of outer openings 36 taper as the plurality of outer openings 36 extend from the mid-portion 36C to the aft end 36B in the illustrative embodiment. In other words, the forward end 36A of each of the plurality of outer openings 36 has a first circumferential width, the aft end 36B has a second circumferential width, and the mid-portion 36C has a third circumferential width. The first circumferential width of the forward end 36A is less than the third circumferential width of the mid-portion 36C and greater than the second circumferential width of the aft end 36B. The second circumferential width of the aft end 36B is less than the third circumferential width of the mid-portion 36C. In some embodiments, each of the plurality of outer openings 36 are larger than an outer end of each of the plurality of vanes 24 such that a plurality of seals are bolted to the outer case 22 to couple each of the plurality of vanes 24 thereto and to close each of the plurality of outer openings 36.

Figure 11:
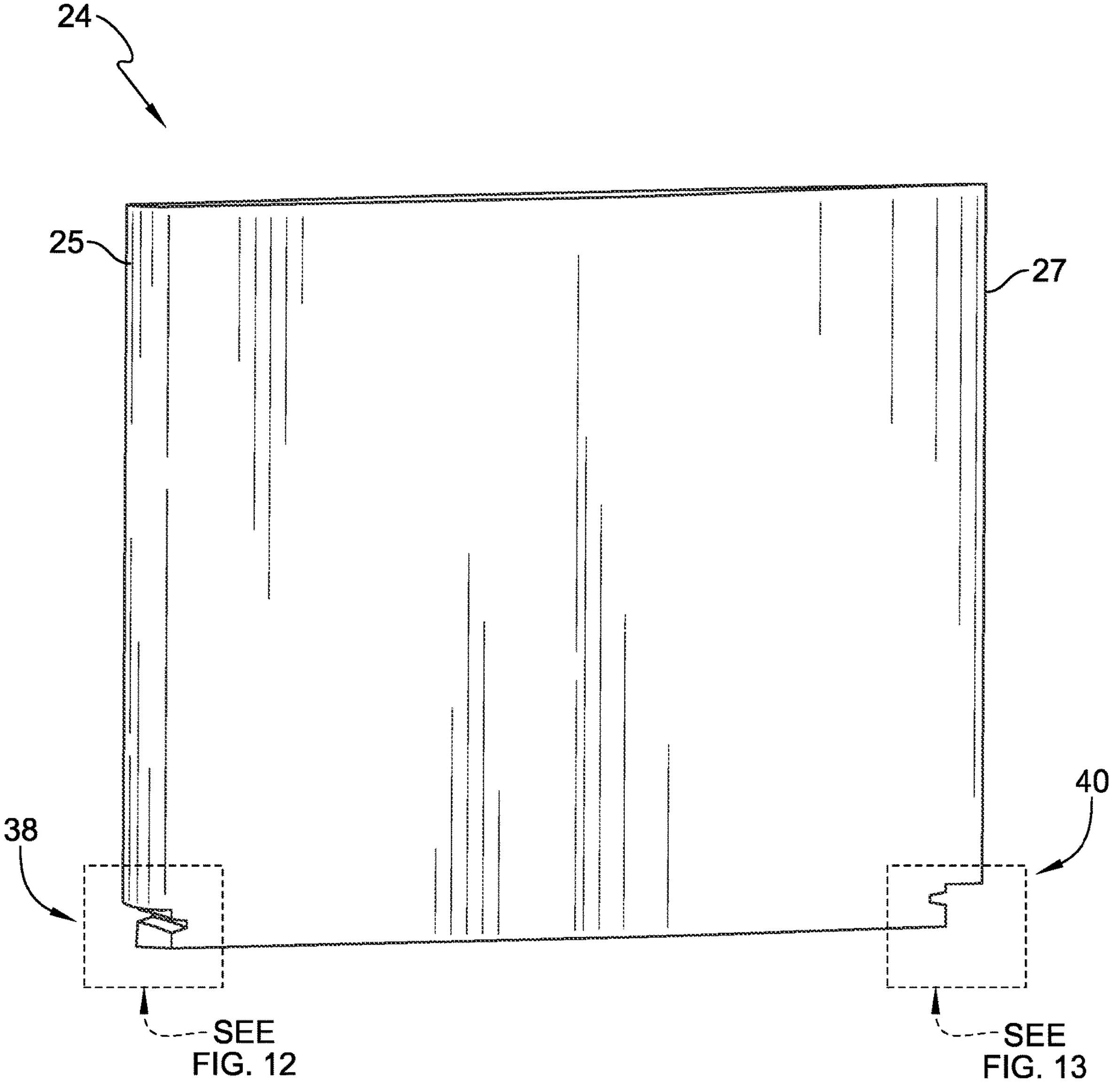
FIG. 11 is a perspective view of one of the plurality of vanes of FIG. 3 showing that the vane is formed to include a notch that extends axially aft into a leading edge of the vane to receive the flange of the first retainer ring therein and the notch that extends axially forward into the trailing edge of the vane to receive the flange of the second retainer ring therein so that the first and the second retainer rings radially locate the vane relative to the central axis.

Each of the plurality of vanes 24 is formed to include a first notch 38 and a second notch 40 as shown in FIGS. 4 and 11. The first notch 38 extends axially aft into each of the plurality of vanes 24 from a leading edge 25 thereof, and the second notch 40 extends axially forward into each of the plurality of vanes 24 from a trailing edge 27 thereof. The first notch 38 is configured to receive the first retainer ring 30 therein and the second notch 40 is configured to receive the second retainer ring 60 therein.

Figure 12:
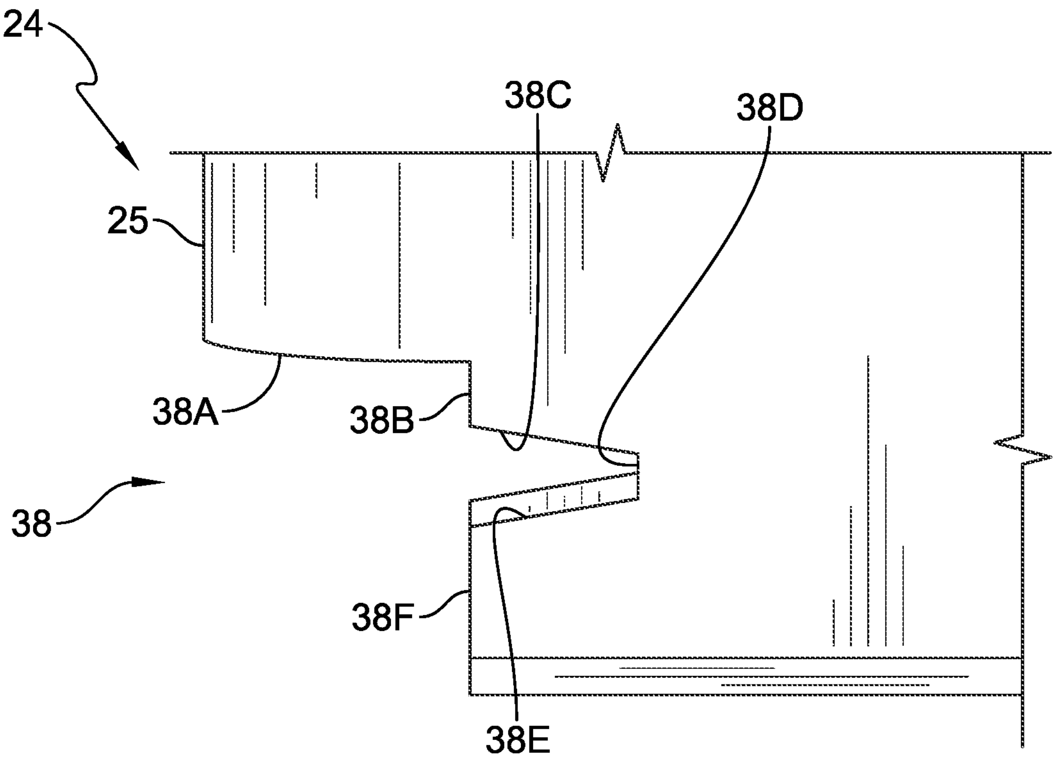
FIG. 12 is an enlarged portion of the vane shown in FIG. 11 showing that the notch formed in the leading edge of the vane extends axially aft into the leading edge of the vane.

The first notch 38 of each of the plurality of vanes 24 is defined by a first surface 38A, a second surface 38B, a third surface 38C, a fourth surface 38D, a fifth surface 38E, and a sixth surface 38F as shown in FIG. 12. The first surface 38A extends axially aft into each of the plurality of vanes 24 from the leading edge 25. The second surface 38B extends radially inward from the first surface 38A to interconnect with the third surface 38C. The third surface 38C interconnects the second surface 38B and the fourth surface 38D, and the third surface 38C extends axially aft and radially inward from the second surface 38B to the fourth surface 38D. The fourth surface 38D extends radially inward between the third surface 38C and the fifth surface 38E. The fifth surface 38E extends axially forward and radially inward from the fourth surface 38D to connect with the sixth surface 38F. The sixth surface 38F extends radially inward from the fifth surface 38E.

Figure 13:
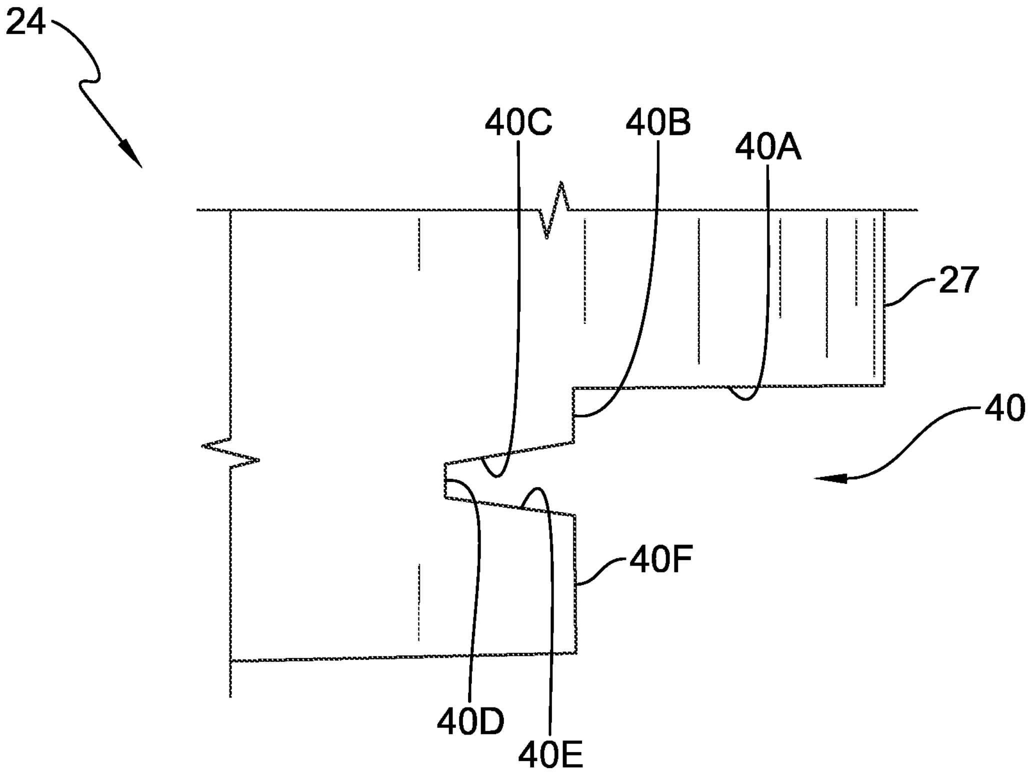
FIG. 13 is an enlarged portion of the vane shown in FIG. 11 showing that the notch formed in the trailing edge of the vane extends axially forward into the trailing edge of the vane.

The second notch 40 of each of the plurality of vanes 24 is defined by a first surface 40A, a second surface 40B, a third surface 40C, a fourth surface 40D, a fifth surface 40E, and a sixth surface 40F as shown in FIG. 13. The first surface 40A extends axially forward into each of the plurality of vanes 24 from the trailing edge 27. The second surface 40B extends radially inward from the first surface 40A to the third surface 40C. The third surface 40C interconnects the second surface 40B and the fourth surface 40D, and the third surface 40C extends axially forward and radially inward from the second surface 40B to the fourth surface 40D. The fourth surface 40D extends radially inward between the third surface 40C and the fifth surface 40E. The fifth surface 40E extends axially aft and radially inward from the fourth surface 40D to connect with the sixth surface 40F. The sixth surface 40F extends radially inward from the fifth surface 40E.

Figure 9:
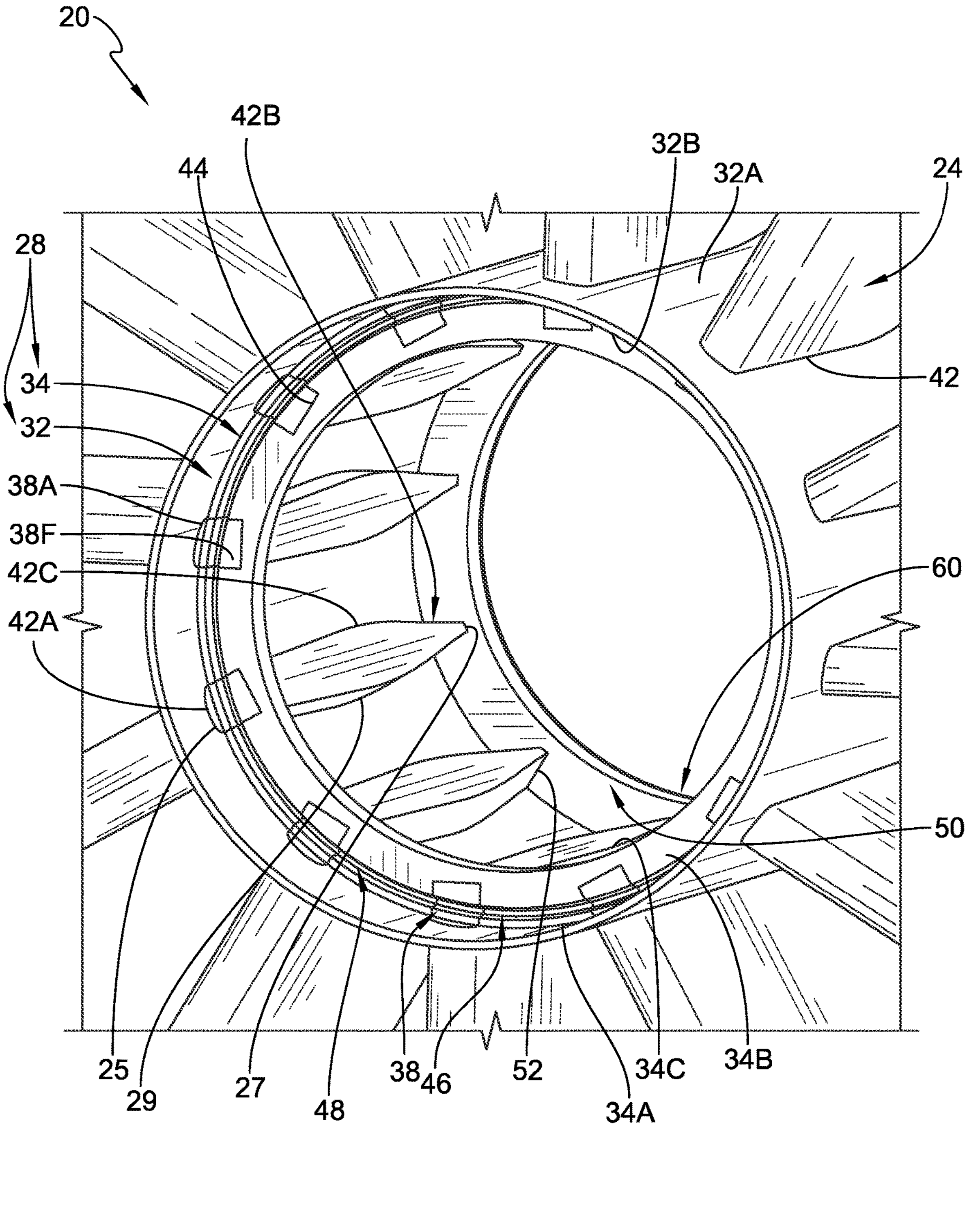
FIG. 9 is an enlarged perspective view of the vane assembly of FIG. 8 with the first retainer ring removed showing that the first band is formed to include a plurality of cutouts extending radially into the first band and spaced apart circumferentially from one another, and further showing that each of the plurality of cutouts is circumferentially aligned with a corresponding one of the plurality of inner openings formed in the inner case so that each vane extends through a corresponding one of the plurality of inner openings and into a corresponding one of the plurality of cutouts formed in the first band.
Figure 10:
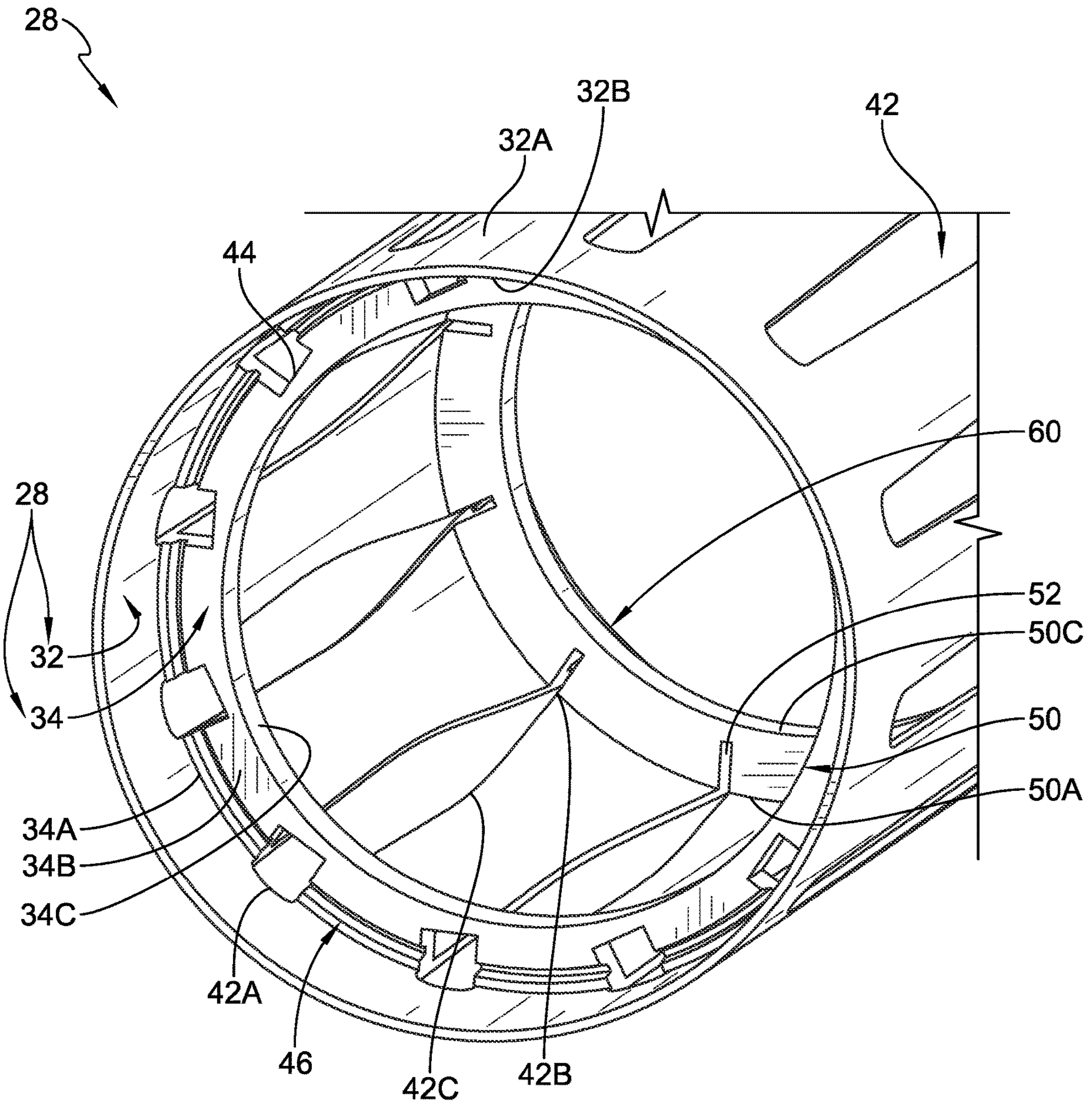
FIG. 10 is an enlarged perspective view of the vane assembly of FIG. 9 with the first retainer ring and the plurality of vanes removed showing that the second band is formed to include a plurality of cutouts extending radially into the second band and spaced apart circumferentially from one another, and further showing that each of the plurality of cutouts of the second band is circumferentially aligned with a corresponding one of the plurality of inner openings formed in the inner case so that each vane extends through a corresponding one of the plurality of inner openings and into a corresponding one of the plurality of cutouts formed in the second band.

The inner body 28 of the inner body assembly 26 includes the inner case 32 and the first band 34 as shown in FIGS. 4, 9, and 10. The inner case 32 is arranged circumferentially about the central axis 11 radially inward of the outer case 22. The inner case 32 includes an outer surface 32A and an inner surface 32B opposite the outer surface 32A. The outer surface 32A provides the inner boundary of the flow path 15 of the vane assembly 20. The first band 34 is coupled with the inner surface 32B of the inner case 32.

The inner case 32 is formed to include a plurality of inner openings 42 to receive the plurality of vanes 24 therein as shown in FIGS. 3 and 10. The plurality of inner openings 42 extend radially through the inner case 32 and are spaced apart circumferentially from one another around the inner case 32. Each of the plurality of inner openings 42 include a forward end 42A, an aft end 42B axially aft of the forward end 42A, and a mid-portion 42C axially between the forward end 42A and the aft end 42B.

Similar to the shape of the plurality of outer openings 36 formed in the outer case 22, each of the plurality of vanes 24 widen as the vanes 24 extend axially from the leading edge 25 to a mid-point 29 of the vanes 24 in the illustrative embodiment as shown in FIGS. 3 and 9. As each of the plurality of vanes 24 extend axially from the mid-point 29 to the trailing edge 27, the vanes 24 taper.

To match an outer shape of the plurality of vanes 24, the plurality of inner openings 42 widen as the plurality of inner openings 42 extend from the forward end 42A to the mid-portion 42C, and the plurality of inner openings 42 taper as the plurality of inner openings 42 extend from the mid-portion 42C to the aft end 42B as shown in FIG. 9. In other words, the forward end 42A has a fourth circumferential width, the aft end 42B has a fifth circumferential width, and the mid-portion 42C has a sixth circumferential width. The fourth circumferential width of the forward end 42A is less than the sixth circumferential width of the mid-portion 42C and greater than the fifth circumferential width of the aft end 42B. The fifth circumferential width of the aft end 42B is less than the sixth circumferential width of the mid-portion 42C.

The first band 34 is positioned radially inward of the inner case 32 and coupled to the inner surface 32B of the inner case 32 as shown in FIGS. 9 and 10. The first band 34 is formed to include a plurality of cutouts 44 that extend radially inward into the first band 34 from an outer surface 34A of the first band 34 as shown in FIGS. 4 and 10. The plurality of cutouts 44 are spaced apart circumferentially from one another around the first band 34. Each of the plurality of cutouts 44 is circumferentially aligned with a corresponding one of the plurality of inner openings 42 formed in the inner case 32 as shown in FIG. 10. At least a portion of the first notch 38 of each of the plurality of vanes 24 is located in a corresponding one of the plurality of cutouts 44.

The first band 34 is formed to include a slot 46 that extends axially aft into the first band 34 from a forward-facing surface 34B of the first band 34 as shown in FIGS. 9 and 10. The slot 46 extends circumferentially about the central axis 11. The slot 46 is formed in the first band 34 closer to the outer surface 34A of the first band 34 than an inner surface 34C of the first band 34. The slot 46 formed in the first band 34 is radially aligned with the first notch 38 formed in the leading edge 25 of each of the plurality of vanes 24 such that the slot 46 and the first notches 38 cooperate to define a continuous retainer ring receiver 48 as shown in FIG. 9. The continuous retainer ring receiver 48 extends entirely circumferentially about the central axis 11.

In illustrative embodiments, the inner body 28 further includes a second band 50 as shown in FIG. 4 The second band 50 is arranged radially inward of the inner case 32 aft of the first band 34. The second band 50 is coupled to the inner surface 32B of the inner case 32 as shown in FIGS. 9 and 10. The second band 50 is formed to include a plurality of cutouts 52 that extend radially inward into the second band 50 from an outer surface 50A of the second band 50 as shown in FIGS. 4 and 10. The plurality of cutouts 52 are spaced apart circumferentially from one another around the second band 50. Each of the plurality of cutouts 52 is circumferentially aligned with a corresponding one of the plurality of inner openings 42 formed in the inner case 32 as shown in FIG. 10. At least a portion of the second notch 40 of each of the plurality of vanes 24 is located in a corresponding one of the plurality of cutouts 52.

A circumferential width of each of the plurality of cutouts 44 formed in the first band 34 is greater than a circumferential width of each of the plurality of cutouts 52 formed in the second band 50, as shown in FIG. 10, so that the cutouts 44, 52 match the outer shape of the plurality of vanes 24. The plurality of cutouts 44 match the shape of the leading edge 25 of each of the plurality of vanes 24. The plurality of cutouts 52 match the shape of the trailing edge 27 of each of the plurality of vanes 24.

Each of the plurality of vanes 24 extends through a corresponding one of the plurality of outer openings 36 formed in the outer case 22, through a corresponding one of the plurality of inner openings 42 formed in the inner case 32, and into a corresponding one of the plurality of cutouts 44 formed in the first band 34 and into a corresponding one of the plurality of cutouts 52 formed in the second band 50. After assembly of each of the plurality of vanes 24 with the inner body 28, the first surface 38A of the first notch 38 of each of the plurality of vanes 24 is flush with the inner surface 32B of the inner case 32 as shown in FIG. 9. The sixth surface 38F of the first notch 38 is flush with the forward-facing surface 34B of the first band 34.

Figure 6:
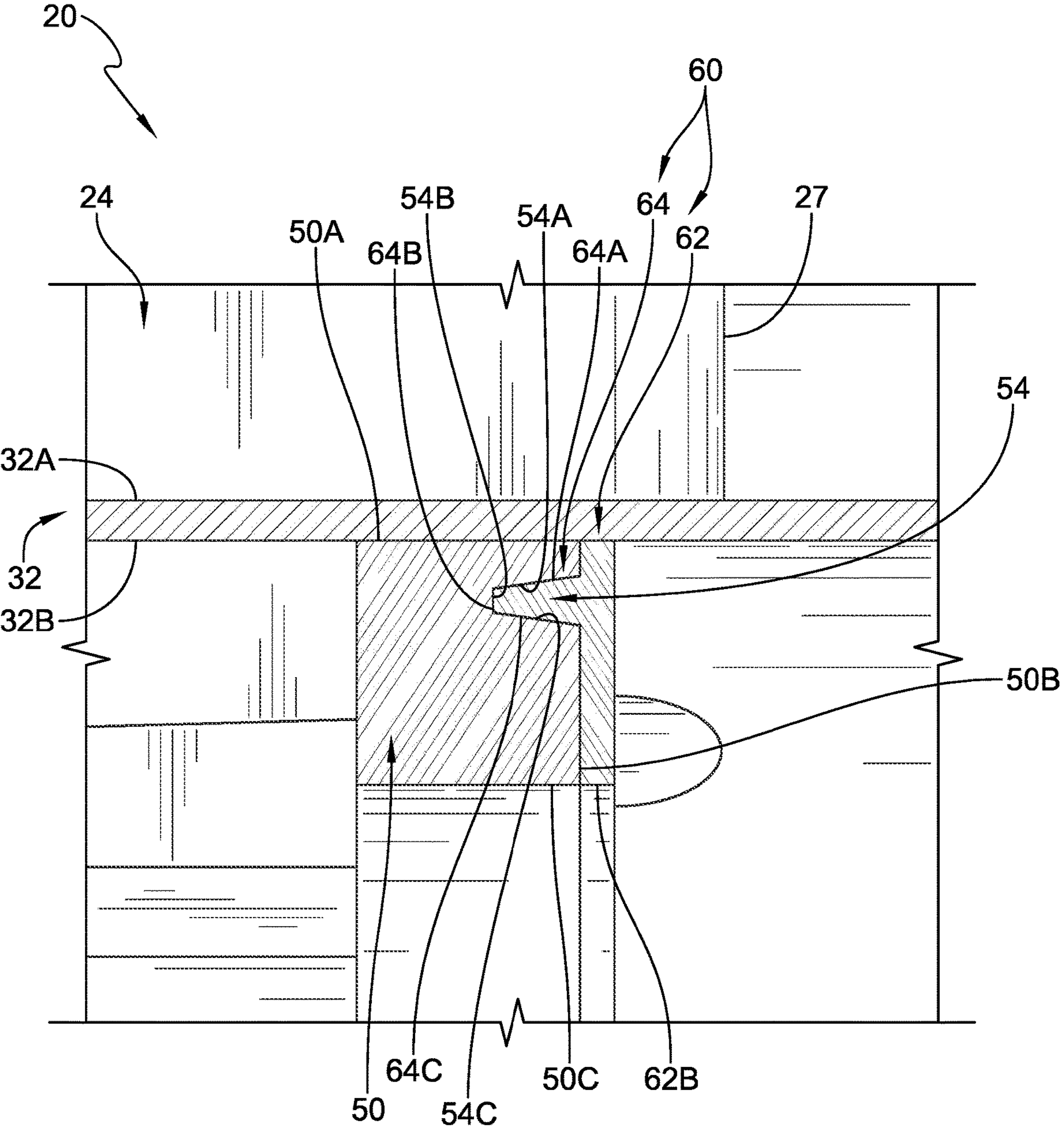
FIG. 6 is an enlarged portion of the vane assembly taken from FIG. 5 showing that the slot of the second band extends axially forward into the second band and the flange of the second retainer ring extends axially forward into the slot formed in the second band so that the second band radially locates the second retainer ring relative to the central axis.

The second band 50 is formed to include a slot 54 that extends axially forward into the second band 50 from an aft-facing surface 50B of the second band 50 as shown in FIG. 6. The slot 54 extends circumferentially about the central axis 11. The slot 54 is formed in the second band 50 closer to the outer surface 50A of the second band 50 than an inner surface 50C of the second band 50. The slot 54 formed in the second band 50 is radially aligned with the second notch 40 formed in the trailing edge 27 of each of the plurality of vanes 24 such that the slot 54 and the second notches 40 cooperate to define a continuous retainer ring receiver.

The slot 54 is defined by a first surface 54A, a second surface 54B, and a third surface 54C as shown in FIG. 6. The first surface 54A extends axially forward and radially inward into the second band 50 from the aft-facing surface 50B of the second band 50. The second surface 54B extends radially inward from the first surface 54A to the third surface 54C. The third surface 54C extends axially aft and radially inward from the second surface 54B to the aft-facing surface 50B of the second band 50.

Figure 5:
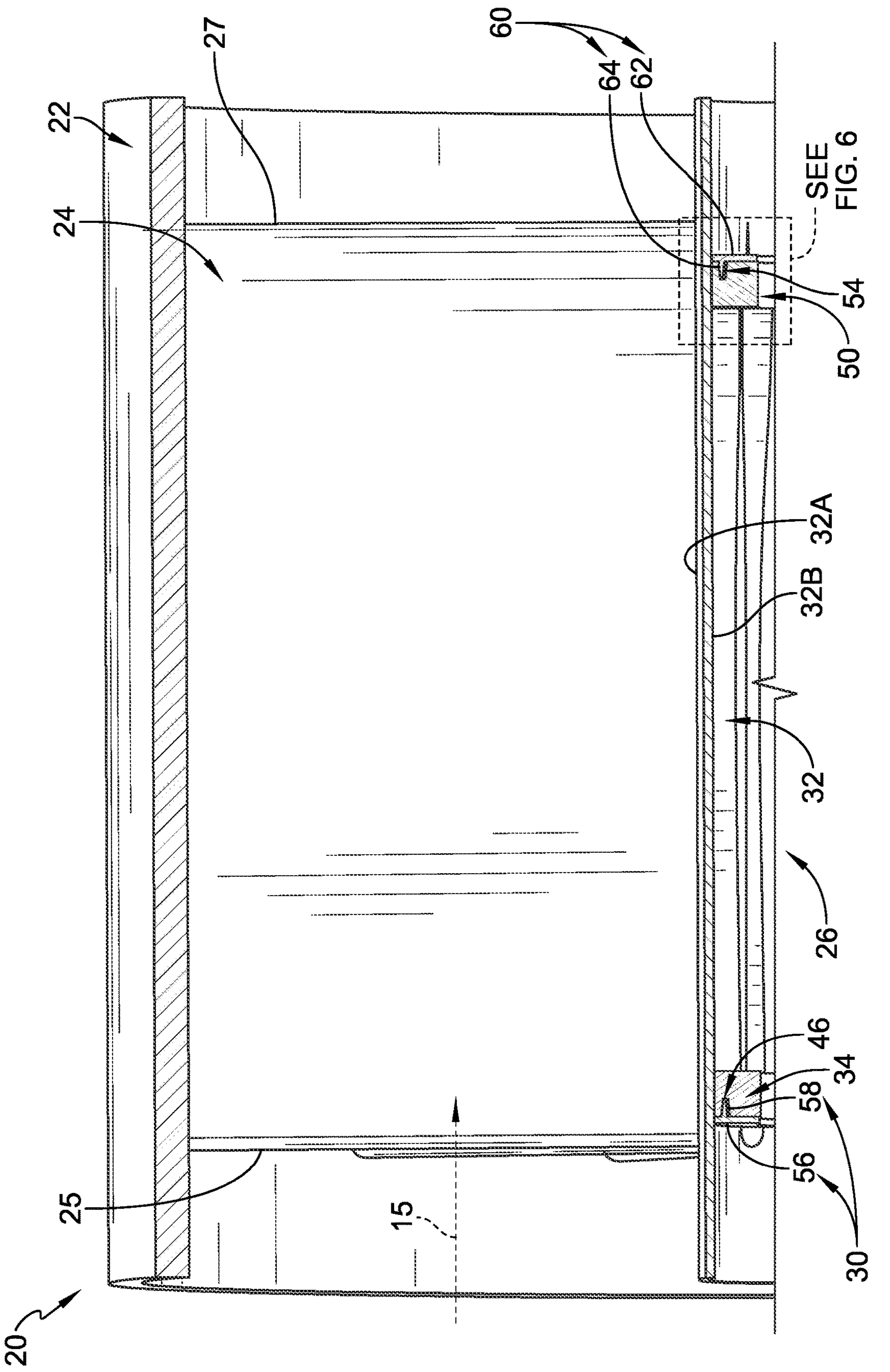
FIG. 5 is a sectional view of the vane assembly taken along line 5-5 of FIG. 3 showing that the first band and the second band are coupled to an inner surface of the inner case, the first band and the second band are each formed to include a slot that extends axially into the first band and the second band, and the first retainer and the second retainer each include a ringbody that extends circumferentially about the central axis and a flange that extends axially away from the ringbody and into the slot formed in the corresponding first band and second band.
Figure 15:
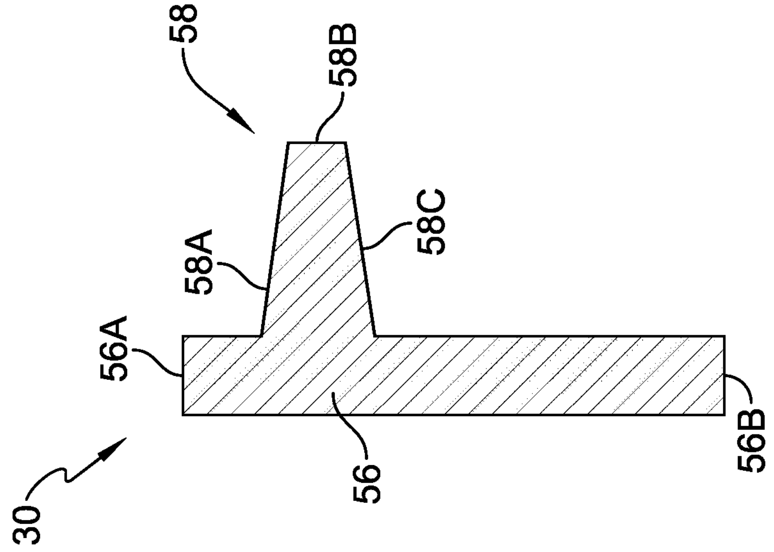
FIG. 15 is a sectional view of the first retainer ring of FIG. 14 showing that the flange of the first retainer ring has a V-shape.

The first retainer ring 30 is positioned radially inward of the inner case 32 and axially forward of the first band 34 as shown in FIG. 3. The first retainer ring 30 extends axially aft into the slot 46 formed in the first band 34 and into the first notch 38 formed in each of the plurality of vanes 24 as suggested in FIG. 8. In other words, the first retainer ring 30 extends into the continuous retainer ring receiver 48. The first retainer ring 30 includes a ringbody 56 and a flange 58 as shown in FIGS. 5 and 15. The ringbody 56 extends circumferentially about the central axis 11. The flange 58 extends axially aft away from the ringbody 56 and is received by the slot 46 formed in the first band 34 and the first notch 38 formed in each of the plurality of vanes 24. The first band 34 radially locates the first retainer ring 30 relative to the central axis 11 because the flange 58 of the first retainer ring 30 is forced to align with the slot 46 of the first band 34. The first retainer ring 30 radially locates each of the plurality of vanes 24 relative to the central axis 11 by blocking each of the plurality of vanes 24 from moving radially outward. The flange 58 extends away from the ringbody 56 closer to an outer surface 56A of the ringbody 56 than an inner surface 56B of the ringbody 56.

In some embodiments, the flange 58 has a V-shape as shown in FIGS. 5 and 15. The flange 58 is formed to include a first surface 58A, a second surface 58B, and a third surface 58C as shown in FIG. 15. The first surface 58A extends axially aft and radially inward from the ringbody 56. The second surface 58B extends radially inward from the first surface 58A to the third surface 58C. The third surface 58C extends axially forward and radially inward from the second surface 58B to connect with the ringbody 56.

Figure 8:
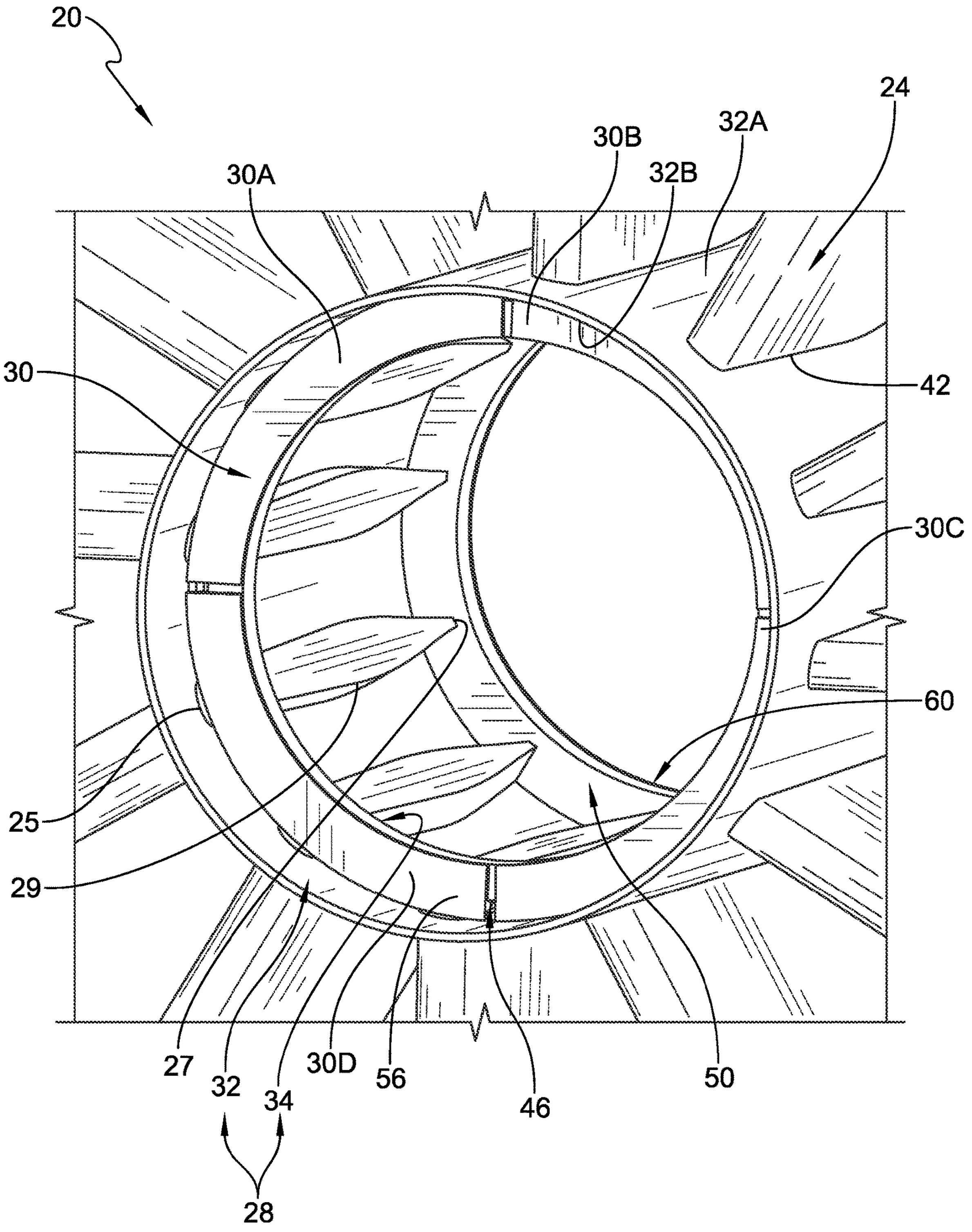
FIG. 8 is an enlarged perspective view of the vane assembly of FIG. 3 showing that the slot of the first band extends circumferentially around the central axis and the first retainer ring includes a plurality of segments that cooperate to extend circumferentially about the central axis.
Figure 14:
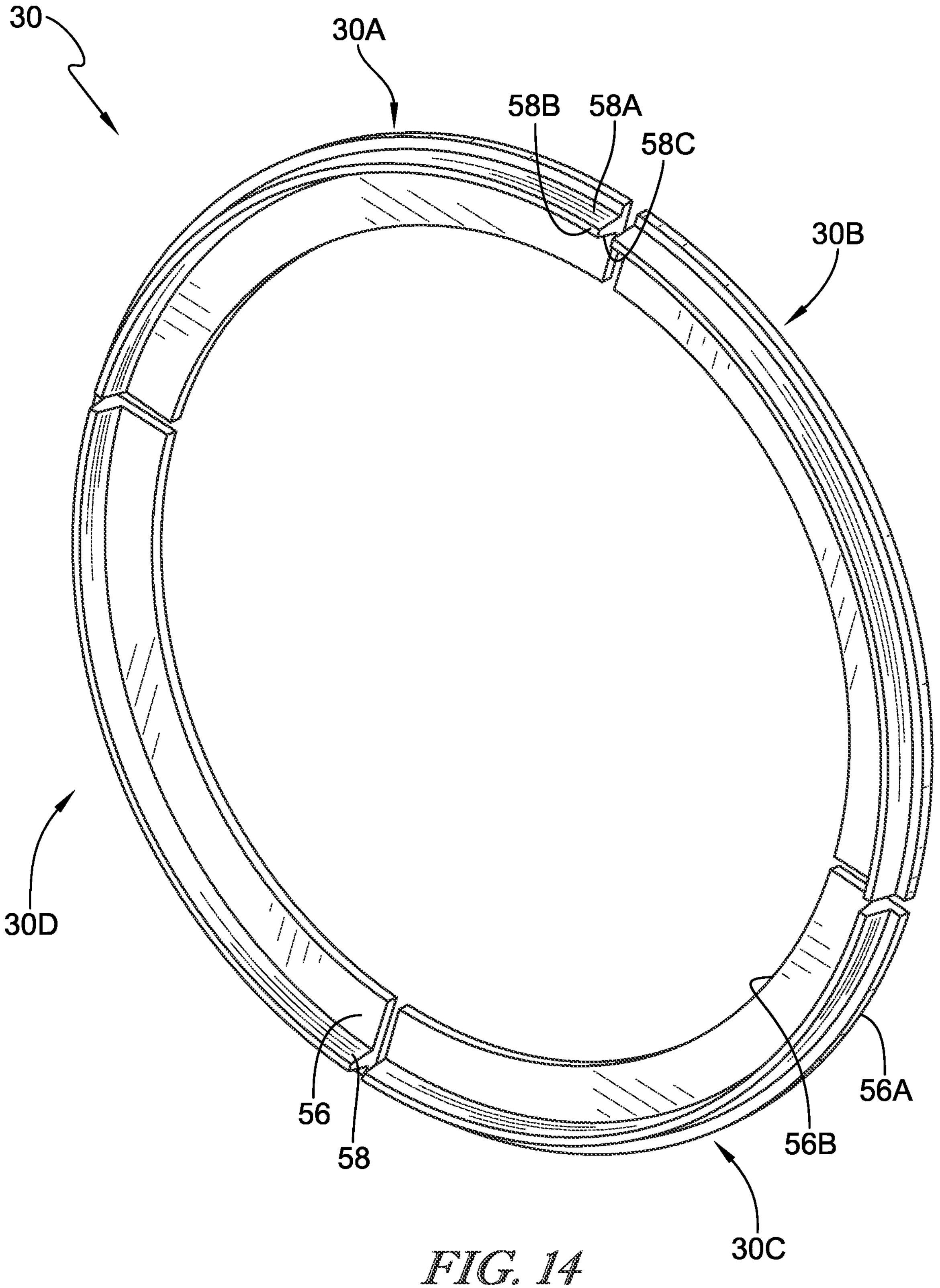
FIG. 14 is a perspective view of the first retainer ring of FIG. 3 showing that the first retainer ring includes a plurality of segments that cooperate to extend circumferentially about the central axis.

The outer surface 56A of the ringbody 56 engages the first surface 38A of the first notch 38 and the inner surface 32B of the inner case 32, depending on the circumferential location, as shown in FIGS. 5, 8, and 14. The first surface 58A of the flange 58 engages the third surface 38C of the first notch 38. The second surface 58B of the flange 58 engages the fourth surface 38D of the first notch 38. The third surface 58C of the flange 58 engages the fifth surface 38E of the first notch 38 as suggested in FIGS. 12 and 15.

The inner body assembly 26 further includes a second retainer ring 60 as shown in FIG. 4. The second retainer ring 60 is identical to the first retainer ring 30. However, the first retainer ring 30 and the second retainer ring 60 are inserted into the inner body 28 in opposite directions. For example, the first retainer ring 30 is inserted with the flange 58 extending axially aft, and the second retainer ring 60 is inserted with a flange 64 of the second retainer ring 60 extending axially forward as suggested in FIG. 4.

Figure 7:
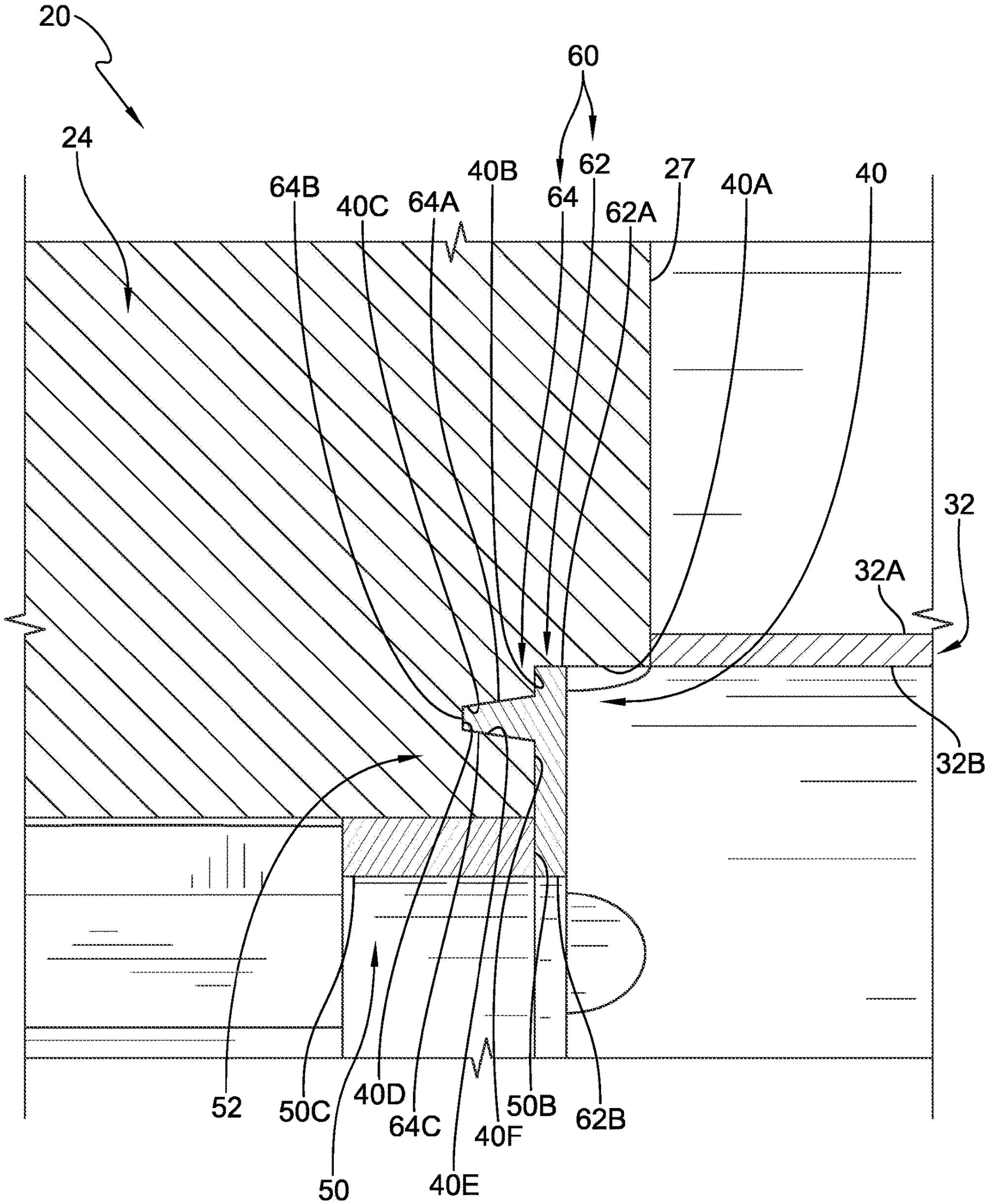
FIG. 7 is an enlarged sectional view of the vane assembly taken through one of the plurality of vanes of FIG. 3 showing that each vane of the plurality of vanes is formed to include a notch that extends axially forward into a trailing edge of each vane and the flange of the second retainer ring extends axially forward into the notch formed in the trailing edge of each vane so that the second retainer ring radially locates each of the plurality of vanes relative to the central axis.

The second retainer ring 60 is positioned radially inward of the inner case 32 and axially aft of the second band 50 as shown in FIG. 4. The second retainer ring 60 extends axially forward into the slot 54 formed in the second band 50 and into the second notch 40 formed in each of the plurality of vanes 24 as shown in FIGS. 6 and 7. The second retainer ring 60 includes a ringbody 62 and the flange 64 as shown in FIGS. 6 and 7. The ringbody 62 extends circumferentially about the central axis 11. The flange 64 extends axially forward away from the ringbody 62 and is received by the slot 54 formed in the second band 50 and the second notch 40 formed in each of the plurality of vanes 24.

The second band 50 radially locates the second retainer ring 60 relative to the central axis 11 because the flange 64 of the second retainer ring 60 is forced to align with the slot 54 of the second band 50. The second retainer ring 60 radially locates each of the plurality of vanes 24 relative to the central axis 11 by blocking each of the plurality of vanes 24 from moving radially outward. The flange 64 extends away from the ringbody 62 closer to an outer surface 62A of the ringbody 62 than an inner surface 62B of the ringbody 62.

In some embodiments, the flange 64 has a V-shape as shown in FIG. 6. The flange 64 is formed to include a first surface 64A, a second surface 64B, and a third surface 64C. The first surface 64A extends axially forward and radially inward from the ringbody 62. The second surface 64B extends radially inward from the first surface 64A to the third surface 64C. The third surface 64C extends axially aft and radially inward from the second surface 64B to connect with the ringbody 62.

The outer surface 62A of the ringbody 62 engages the inner surface 32B of the inner case 32 and the first surface 40A of the second notch 40 as shown in FIGS. 6 and 7, depending on the circumferential location. The first surface 64A of the flange 64 engages the third surface 40C of the second notch 40 and the first surface 54A of the slot 54. The second surface 64B of the flange 64 engages the fourth surface 40D of the second notch 40 and the second surface 54B of the slot 54. The third surface 64C of the flange 64 engages the fifth surface 40E of the second notch 40 and the third surface 54C of the slot 54 as shown in FIGS. 6 and 7.

After assembly of each of the plurality of vanes 24 with the inner body 28, the first surface 40A of the second notch 40 of each of the plurality of vanes 24 is flush with the inner surface 32B of the inner case 32 as shown in FIG. 7. The sixth surface 40F of the second notch 40 is flush with the aft-facing surface 50B of the second band 50.

In some embodiments, one of the retainer rings 30, 60 and one of the bands 34, 50 are omitted such that each of the plurality of vanes 24 are secured at the leading edge 25 thereof or the trailing edge 27 thereof instead of at both edges 25, 27. In some embodiments, the first band 34 and the second band 50 are welded to the inner surface 32B of the inner case 32. In some embodiments, the first retainer ring 30 includes a plurality of segments 30A, 30B, 30C, 30D that cooperate to extend circumferentially about the central axis 11 as shown in FIGS. 4 and 8. In some embodiments, the second retainer ring 60 includes a plurality of segments that cooperate to extend circumferentially about the central axis 11 as shown in FIG. 4. Though shown with four segments, the first retainer ring 30 and the second retainer ring 60 may include any number of segments.

In some embodiments, the first retainer ring 30 and the second retainer ring 60 may be coupled to the first band 34 and the second band 50, respectively, via an axially-extending bolt. In some embodiments, the first retainer ring 30 and the second retainer ring 60 may be press fit with the first band 34 and the second band 50, respectively.

To assemble the vane assembly 20, the inner case 32 is arranged radially inward of the outer case 22. The first band 34 and the second band 50 are coupled with the inner surface 32B of the inner case 32 such that the slot 46 formed in the first band 34 opens axially forward, and the slot 54 formed in the second band 50 opens axially aft. Each of the plurality of vanes 24 are inserted radially inward through a corresponding one of the plurality of outer openings 36 formed in the outer case 22, through a corresponding one of the plurality of inner openings 42 formed in the inner case 32, and into a corresponding one of the plurality of cutouts 44 formed in the first band 34 and a corresponding one of the plurality of cutouts 52 formed in the second band 50. The first retainer ring 30 is inserted by moving the first retainer ring 30 axially aft into engagement with the first band 34. The flange 58 of the first retainer ring 30 extends into the slot 46 formed in the first band 34 and the first notch 38 formed in each of the plurality of vanes 24.

The second retainer ring 60 is inserted by moving the second retainer ring 60 axially forward into engagement with the second band 50. The flange 64 of the second retainer ring 60 extends into the slot 54 formed in the second band 50 and the second notch 40 formed in each of the plurality of vanes 24. The first retainer ring 30 and the second retainer ring 60 cooperate to block axial movement of each of the plurality of vanes 24 as each of the plurality of vanes 24 are located between the first retainer ring 30 and the second retainer ring 60.

Figure 16:
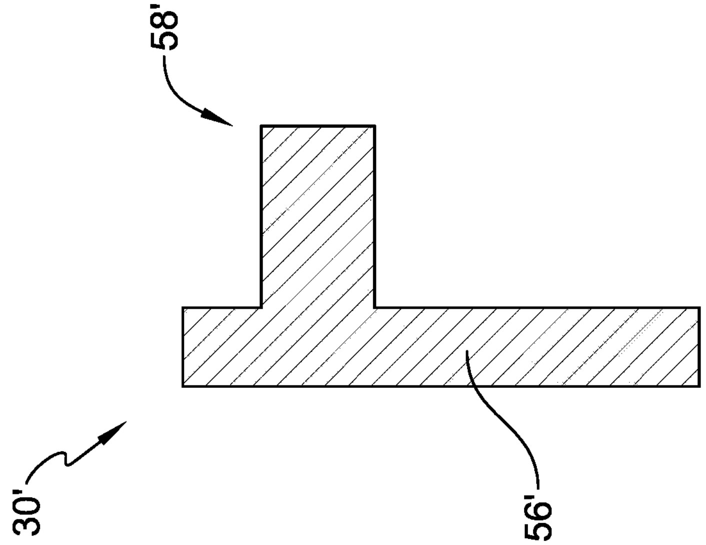
FIG. 16 is a sectional view of another embodiment of a first retainer ring for use with the vane assembly of FIG. 3 showing that a flange of the first retainer ring has a rectangular shape.

Another embodiment of a first retainer ring 30' in accordance with the present disclosure is shown in FIG. 16. The first retainer ring 30' is substantially similar to the first retainer ring 30 shown in FIGS. 1-15 and described herein. Accordingly, similar reference numbers including a prime indicate features that are common between the first retainer ring 30 and the first retainer ring 30'. The description of the first retainer ring 30 is incorporated by reference to apply to the first retainer ring 30', except in instances when it conflicts with the specific description and the drawings of the first retainer ring 30'.

The first retainer ring 30' includes a ringbody 56' and a flange 58' as shown in FIG. 16. The ringbody 56' extends circumferentially about the central axis 11. The flange 58' extends axially aft away from the ringbody 56'. The flange 58' has a rectangular shape. The second retainer ring is identical to the first retainer ring 30'. The slot formed in the first band, the slot formed in the second band, and the notches formed in each of the plurality of vanes have a shape to match the rectangular shape of the flange 58'.

Figure 17:
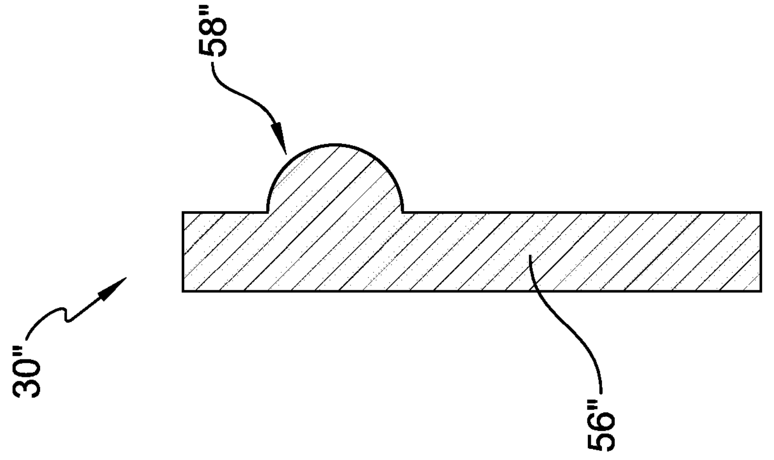
FIG. 17 is a sectional view of another embodiment of a first retainer ring for use with the vane assembly of FIG. 3 showing that a flange of the first retainer ring has a semi-circle shape.

Another embodiment of a first retainer ring 30" in accordance with the present disclosure is shown in FIG. 17. The first retainer ring 30" is substantially similar to the first retainer ring 30 shown in FIGS. 1-15 and described herein. Accordingly, similar reference numbers including a double prime indicate features that are common between the first retainer ring 30 and the first retainer ring 30". The description of the first retainer ring 30 is incorporated by reference to apply to the first retainer ring 30", except in instances when it conflicts with the specific description and the drawings of the first retainer ring 30".

The first retainer ring 30" includes a ringbody 56" and a flange 58" as shown in FIG. 17. The ringbody 56" extends circumferentially about the central axis 11. The flange 58" extends axially aft away from the ringbody 56". The flange 58" has a semi-circle shape. The second retainer ring is identical to the first retainer ring 30". The slot formed in the first band, the slot formed in the second band, and the notches formed in each of the plurality of vanes have a shape to match the semi-circle shape of the flange 58".

Figure 18:
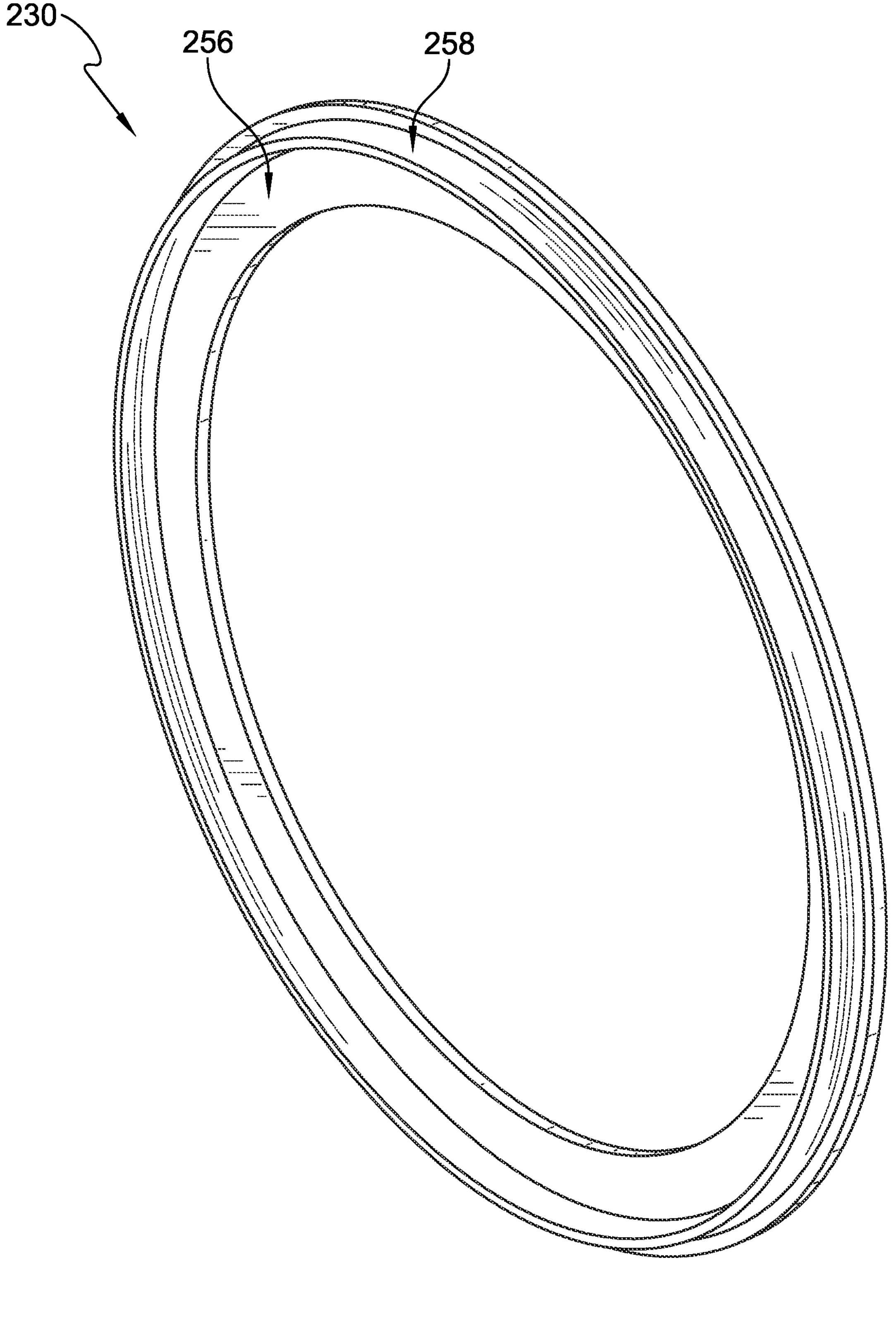
FIG. 18 is a perspective view of another embodiment of a first retainer ring for use with the vane assembly of FIG. 3 showing that the first retainer ring is an integral, single-piece that forms a full hoop, and further showing that the first retainer ring including a ringbody that extends entirely circumferentially about the central axis and a flange that extends axially away from the ringbody and entirely circumferentially about the central axis.

Another embodiment of a first retainer ring 230 in accordance with the present disclosure is shown in FIG. 18. The first retainer ring 230 is substantially similar to the first retainer ring 30 shown in FIGS. 1-15 and described herein. Accordingly, similar reference numbers in the 200 series indicate features that are common between the first retainer ring 30 and the first retainer ring 230. The description of the first retainer ring 30 is incorporated by reference to apply to the first retainer ring 230, except in instances when it conflicts with the specific description and the drawings of the first retainer ring 230.

As compared to the first retainer ring 30, the first retainer ring 230 is an integral, single-piece that forms a full hoop. The first retainer ring 230 includes a ringbody 256 and a flange 258 as shown in FIG. 18. The ringbody 256 and the flange 258 extend entirely circumferentially about the central axis 11. The second retainer ring is identical to the first retainer ring 230.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A vane assembly adapted for use in a gas turbine engine, the vane assembly comprising an outer case arranged around a central axis to define an outer boundary of a flow path of the vane assembly, a plurality of vanes that extend radially inward from the outer case to direct air through the flow path, and an inner body assembly arranged around the central axis to define an inner boundary of the flow path of the vane assembly and configured to secure the plurality of vanes radially relative to the central axis, the inner body assembly including an inner body and a retainer ring, wherein the inner body includes a band and an inner case arranged circumferentially about the central axis and having an outer surface that provides the inner boundary of the flow path of the vane assembly and an inner surface opposite the outer surface, the band is coupled with the inner surface of the inner case and the retainer ring extends into the band of the inner body and into each of the plurality of vanes so that the band radially locates the retainer ring relative to the central axis and the retainer ring radially locates each of the plurality of vanes relative to the central axis, wherein the band and each of the plurality of vanes cooperate to form a continuous retainer ring receiver having an axially-facing opening that receives a portion of the retainer ring therein such that the retainer ring is removably coupled to the band and each of the plurality of vanes.

2. The vane assembly of claim 1, wherein the band is formed to include a slot that extends axially into the band and each vane of the plurality of vanes is formed to include a notch that extends axially into each vane.

3. The vane assembly of claim 2, wherein the slot formed in the band extends circumferentially about the central axis.

4. The vane assembly of claim 2, wherein the slot formed in the band and the notch formed in each vane of the plurality of vanes are radially aligned with one another and cooperate to form the continuous retainer ring receiver that extends entirely circumferentially about the central axis.

5. The vane assembly of claim 2, wherein the retainer ring includes a ringbody that extends circumferentially about the central axis and a flange that extends axially away from the ringbody and into the slot formed in the band and the notch formed in each vane of the plurality of vanes.

6. The vane assembly of claim 5, wherein the retainer ring includes a plurality of segments that cooperate to extend circumferentially about the central axis.

7. The vane assembly of claim 5, wherein the retainer ring is an integral, single-piece that forms a full hoop, and wherein the flange of the retainer ring extends entirely circumferentially about the central axis.

8. The vane assembly of claim 1, wherein the outer case is formed to include a plurality of outer openings extending radially through the outer case and the plurality of outer openings are spaced apart circumferentially from one another, and wherein the inner case is formed to include a plurality of inner openings extending radially through the inner case and the plurality of inner openings are spaced apart circumferentially from one another, and wherein each vane of the plurality of vanes extends through a corresponding one of the plurality of outer openings and through a corresponding one of the plurality of inner openings.

9. The vane assembly of claim 8, wherein the band is formed to include a plurality of cutouts extending radially into the band and the plurality of cutouts are spaced apart circumferentially from one another, and wherein each vane of the plurality of vanes is located within a corresponding one of the plurality of cutouts.

10. The vane assembly of claim 9, wherein each cutout of the plurality of cutouts is circumferentially aligned with a corresponding one of the plurality of inner openings so that each vane of the plurality of vanes extends through a corresponding one of the plurality of inner openings and into a corresponding one of the plurality of cutouts.

11. A vane assembly adapted for use in a gas turbine engine, the vane assembly comprising an outer case arranged around a central axis to define an outer boundary of a flow path of the vane assembly, a vane that extends radially inward from the outer case to direct air through the flow path, and an inner body assembly including an inner body arranged around the central axis to define an inner boundary of the flow path of the vane assembly and a retainer ring configured to fix the vane radially relative to the central axis, the inner body having an inner case arranged to extend circumferentially about the central axis and a band arranged radially inward of the inner case, wherein the retainer ring is arranged radially inward of the inner case and extends axially into the band of the inner body and the vane to secure the vane to the inner case and prevent radial outward movement of the vane relative to the central axis, wherein the band of the inner body is formed to include a slot that extends axially into the band and circumferentially about the central axis, and wherein the vane is formed to include a notch that extends axially into the vane, wherein the retainer ring includes a ringbody that extends circumferentially about the central axis and a flange that extends axially away from the ringbody and into the slot formed in the band and the notch formed in the vane.

12. The vane assembly of claim 11 wherein the slot formed in the band and the notch formed in the vane are radially aligned with one another.

13. The vane assembly of claim 11, wherein the outer case is formed to include an outer opening extending radially through the outer case, and wherein the inner case is formed to include an inner opening extending radially through the inner case, and wherein the vane extends through the outer opening and through the inner opening.

14. The vane assembly of claim 13, wherein the band is formed to include a cutout extending radially into the band, and wherein the vane is located within the cutout.

15. The vane assembly of claim 11, wherein the retainer ring includes a plurality of segments that cooperate to extend circumferentially about the central axis.

16. The vane assembly of claim 11, wherein the retainer ring is an integral, single-piece that forms a full hoop, and wherein the flange of the retainer ring extends entirely circumferentially about the central axis.

17. A method comprising:

arranging an inner case that extends circumferentially around a central axis radially inward of an outer case that extends circumferentially around the central axis to define a flow path therebetween, coupling a band with the inner case to locate the band radially inward of the inner case, extending a vane radially between the outer case and the inner case, axially positioning a retainer ring radially inward of the inner case and axially adjacent the band, and moving the retainer ring axially into engagement with each of the band and the vane so that a flange of the retainer ring extends axially into each of the band and the vane.

18. The method of claim 17, further comprising inserting the vane radially through an outer opening extending radially through the outer case and an inner opening extending radially through the inner case.

19. The method of claim 17, further comprising positioning a radially-inward end of the vane in a cutout extending radially into the band.

20. The method of claim 17, wherein the band is a first band and the retainer ring is a first retainer ring, and wherein the method further comprises coupling a second band with the inner case axially aft of the first band, axially positioning a second retainer ring radially inward of the inner case and axially adjacent the second band, and moving the second retainer ring axially into engagement with each of the second band and the vane so that a flange of the second retainer ring extends axially into each of the second band and the vane.

* * * * *